(No Model.) 2 Sheets—Sheet 1.
J. VOEGTLE.
SCHOOL HOUSE HEATER.
No. 270,706. Patented Jan. 16, 1883.
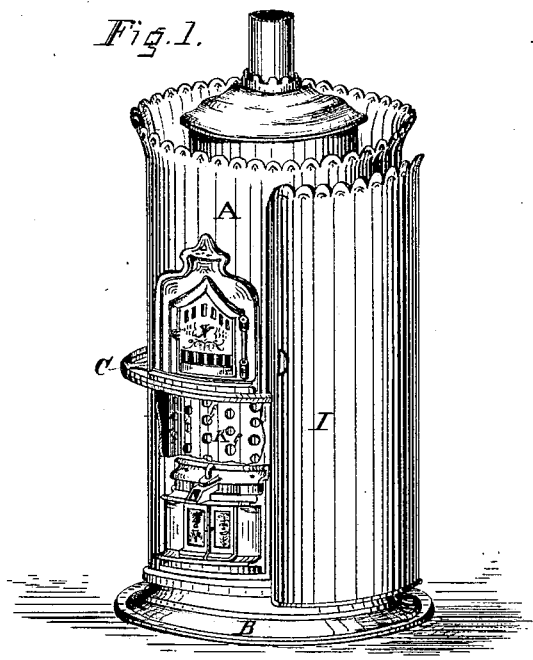
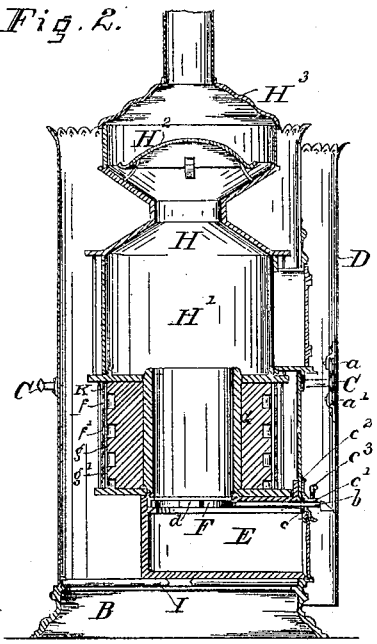
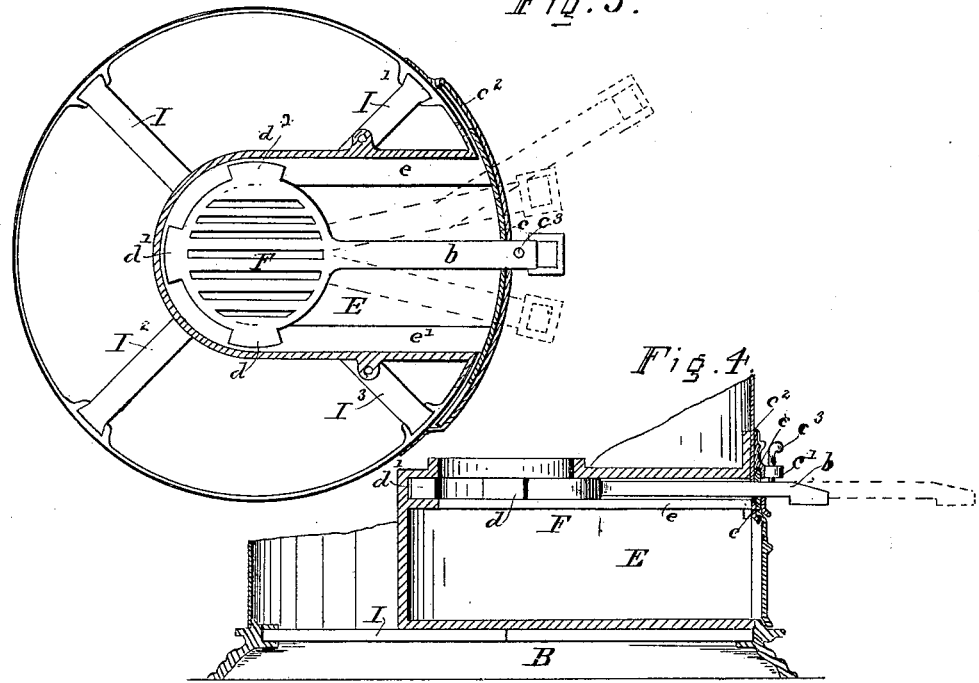
WITNESSES.
Jacob W. Loeper
H. C. Allen
INVENTOR.
Jacob Voegtle
By C. P. Jacobs
atty (No Model.) 2 Sheets—Sheet 2.
J. VOEGTLE.
SCHOOL HOUSE HEATER.
No. 270,706. Patented Jan. 16, 1883.
Fig. 5. Fig. 6.
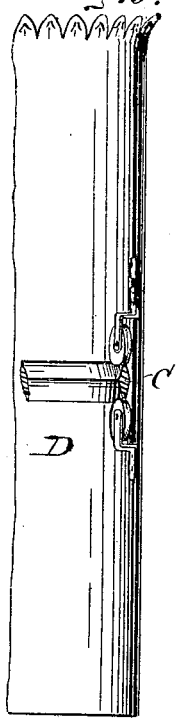
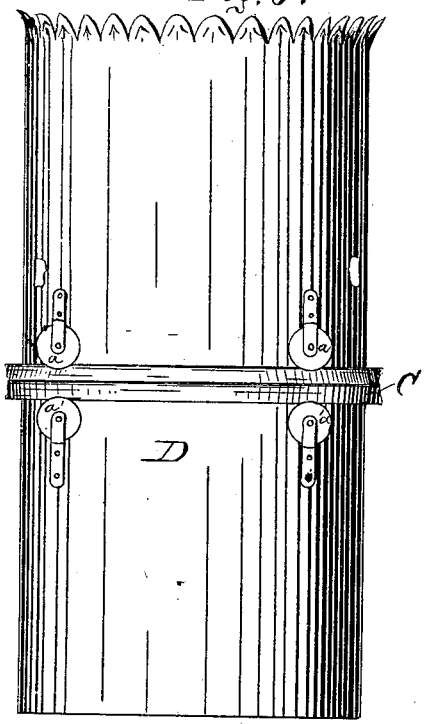
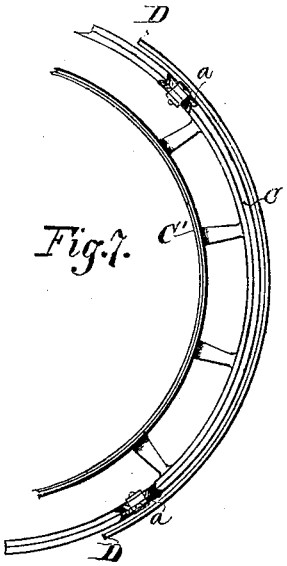
Fig. 7.
Fig. 9.
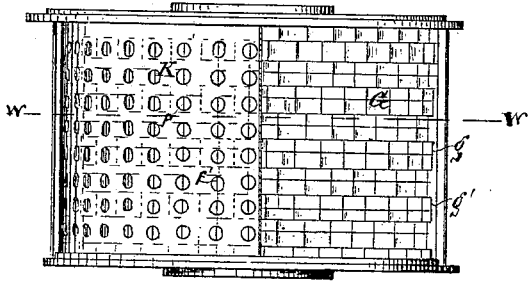
Fig. 8.
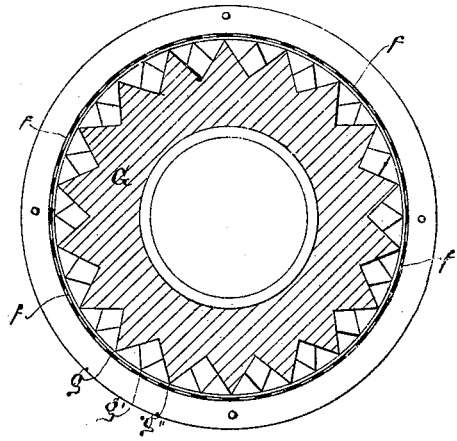
WITNESSES.
Jacob W. Loeper
H. C. Allen
INVENTOR.
Jacob Voegtle.
By C. P. Jacobs.
Atty.

UNITED STATES PATENT OFFICE.

JACOB VOEGTLE, OF INDIANAPOLIS, INDIANA.

SCHOOL-HOUSE HEATER.

SPECIFICATION forming part of Letters Patent No. 270,706, dated January 16, 1883.

Application filed June 12, 1882. (No model.)

*To all whom it may concern:*

Be it known that I, JACOB VOEGTLE, of Indianapolis, Indiana, have invented a new and useful Improvement in School-House Heaters, of which the following is a description, reference being made to the accompanying drawings, in the several figures of which like letters indicate like parts.

My invention is a heater, and is designed to heat school-houses and large halls, and it may be used in cellars and basements in connection with inclosing-walls (or without them, as may be desired) and hot-air pipes. My object is to furnish a copious supply of heat which shall be healthful and mild, and without bringing the air in contact with red-hot iron, which destroys its vitality. I accomplish this, first, by the peculiar construction of my fire-pot, whereby a large surface is exposed to the fresh air, and by the arrangement of the shell or casing of the heater.

My invention consists in the peculiar construction of the fire-pot, the ash-pit, the movable grate and its attachments, the revolving shield, the radiator having an inclined inner surface upon which the flue-divider rests, and the combination and arrangement of the several parts, as hereinafter specified.

In the drawings, Figure 1 represents a front view of my heater with a portion of the shell or casing cut away, showing the perforated screen surrounding the fire-pot. Fig. 2 is a vertical section, showing the interior construction. Fig. 3 is a cross-section below the fire-pot, showing the grate and the radial arms which rest in sockets in the base of the heater. Fig. 4 is a vertical section of that part of the heater below the fire-pot. Fig. 5 is a side view of a portion of the revolving shield resting on its sustaining-ring; and Fig. 6 is a front view of the shield, looking inward. Fig. 7 is a cross-section of the shield, ring, and shell of the heater, showing the relation of the three, and the lateral extent of the shield is indicated by D D. Fig. 8 is a horizontal cross-section of the fire-pot and its surrounding screen, in which the openings are indicated by the white spaces, and are marked F. The wedge-shape projections of the successive layers of brick composing the fire-pot are indicated by $g$, $g'$, and $g''$. The central part of the fire-pot is marked G. Fig. 9 is a front view of the fire-pot with a portion of the perforated screen K cut away, showing the wedge-shaped projections of the exterior surface of the fire-pot G.

To describe the several parts in detail, A is the casing of the heater; B, the base, which has on the inside sockets to receive the radial arms I I' I² I³, Fig. 3, attached to the under side of the ash-pit and on which it rests.

C is a ring which surrounds the heater, and is connected by short arms with an inner ring, C', which fits closely to the casing of the heater, and if the latter is made in two sections serves to unite them.

On the outer ring, C, is placed a shield, D, having rollers attached to the inner side, as shown in Fig. 6, and these rollers rest upon the edge of the ring C, and by means of these the shield D, the lateral extent of which is shown in Fig. 7, may be moved around to any side of the heater. Its use is to ward off excessive heat.

E is the ash-pit, sustained by the radial arms I, as described, having a recess or groove, $e\, e'$, at the top, as shown in Fig. 3, in which slides the grate F, having a handle, $b$, by means of which the grate may be drawn out and moved around, as shown by the dotted lines in Fig. 3.

$d\, d^2$ are lugs or guides to fit the grooves $e\, e'$.

$c$ is a slide-plate, which moves with the handle $b$, the latter passing through it in the space formed between the front plate, $c^2$, which is shouldered at either end, as shown in Fig. 3, and the casing of the heater, on either side of the opening for the ash-pit.

$c'$ is a projection supporting a pin which fits an opening, $c^3$, in the shaker or grate-handle, and is actuated by a spring to form a catch to hold the parts together.

In Fig. 4 the dotted lines show the position of the handle or shaker $b$ when drawn out. The plate $c^2$ may be easily removed, being attached by bolts and nuts, and the grate may then be wholly withdrawn when necessary.

G is the fire-pot, which is fitted to rest over a shoulder or rim upon the upper part of the frame of the ash-pit. It may be constructed of any suitable material and lined with fire-brick, if desired. The opening or pot proper is cylindrical; but the exterior surface is constructed, as shown in cross-section in Fig. 8, of sections or layers whose edges have V-shaped projections which do not overlap, but alternate in successive rows, as shown. By this method of construction I expose to the air a much greater surface than if the outer walls were even and uniform.

I am aware that short rods or radiating-points have been used upon the exterior walls of the fire-pot, as in the furnace of Mathivet, No. 151,894, June 9, 1874, and that projections have been used upon the backs of stove-linings, as in the Letters Patent of Herrick, No. 160,906, March 16, 1875; but the latter are used for a different purpose—to prevent the plate from being burned—and I do not broadly claim such points or studs; but I believe the V-shaped projections of the sections composing my fire-pot are peculiar to my device, and are much better than the short rods or points shown in the Mathivet furnace. A much greater surface is exposed to the fresh air by my method than in any of the others. I surround this fire-pot with a perforated screen, K, having openings, as shown at $f$, Fig. 8. Air may be taken up from beneath the heater or through openings in the sides of the base.

H' is a radiating-drum, which rests upon the fire-pot and screen, and has a greater diameter than either, but has an opening in the bottom of the same size as that in the fire-pot. In the front part of this drum is an opening for filling the pot with fuel, and a corresponding opening in the casing A is closed by the upper door shown in Fig. 1. Upon this drum rests a cover, H, shaped like a flattened hour-glass, having an opening in the center large enough to carry away the smoke. Over this opening, and resting upon the funnel-shaped sides of the part H', is placed a flue-dividing cap, $H^2$, which prevents a direct draft up the smoke-pipe. The funnel-shaped sides of the part H prevent the ashes from lodging as they fall down its incline into the fire-pot whenever they accumulate in any quantity, and the flue-dividing cap prevents them from being drawn up into the parts above. Over all is placed a top piece, $H^3$, with which the smoke-pipe is connected. The doors to the ash-pit are shown in Fig. 1 near the bottom of the heater.

I am aware that a stove-grate arranged to slide back and forth, and at the same time to rotate horizontally, has been heretofore used, and this I do not broadly claim.

What I claim, and desire to secure by Letters Patent, is the following:

1. In a heater, an ash-pit resting upon radial arms which fit into dovetailed sockets in the base of the heater, and provided with grooves at the top for receiving a circular grate, in combination with a circular grate having one or more flanges on the sides, and susceptible of being drawn out toward the front of the heater and of moving with a rotary motion by means of a suitable handle or arm, substantially as described.

2. In a heater, a fire-pot having a cylindrical opening whose exterior walls are composed of horizontal sections which have V-shaped projections, which do not overlap but alternate with each other in successive rows, substantially as described.

3. In a heater, a cylindrical fire-pot composed of layers or sections, the outer edges of which are V-shaped, and whose triangular projections do not overlap but alternate with each other in successive rows, and surrounded with a perforated screen, substantially as described.

4. In a heater whose outer or hot-air casing is surrounded by a flange, an external shield adapted to revolve thereon, and sustained at any point about the heater, substantially as described.

5. In combination with the outer or hot-air casing of the heater, an external shield sustained by a rim connected with the casing, and horizontally adjustable thereon at any point, substantially as described.

6. In a heater, the combination of the outer casing, having a flange or ring, a revolving shield, a fire-pot with pointed projections upon its outer surface, which do not overlap each other, but alternate in successive rows, a recessed ash-pit supported from the base, a grate, a radiating-drum having a cover with funnel-shaped top, a flue-divider, and a cap for connecting with the smoke-pipe, substantially as described.

In witness whereof I have hereunto set my hand, and in the presence of witnesses, this 8th day of June, 1882.

JACOB VOEGTLE.

Witnesses:
C. P. JACOBS,
H. C. ALLEN.